Feb. 23, 1926.
F. K. LANDGRAF
1,574,583
FORCE FEED LUBRICATOR
Filed Jan. 31, 1924
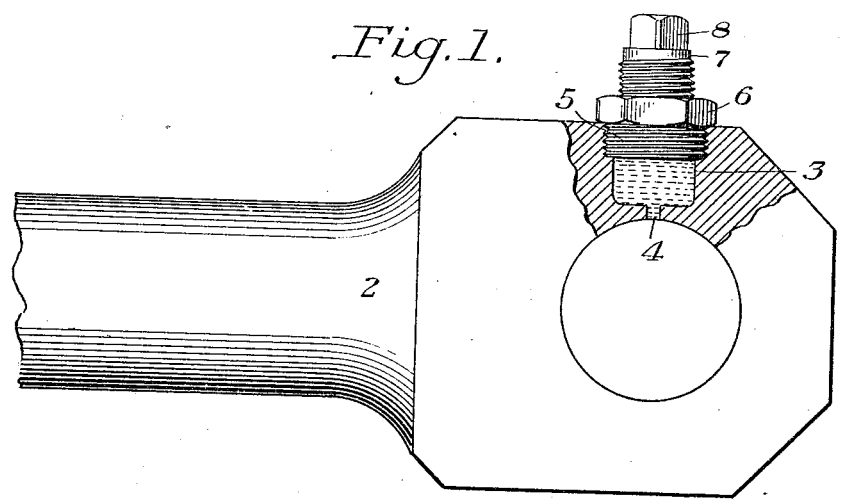
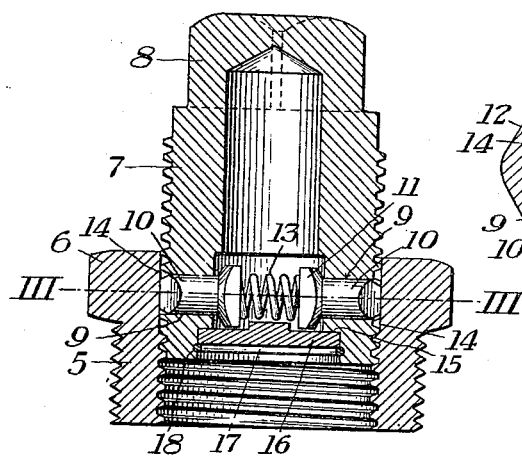
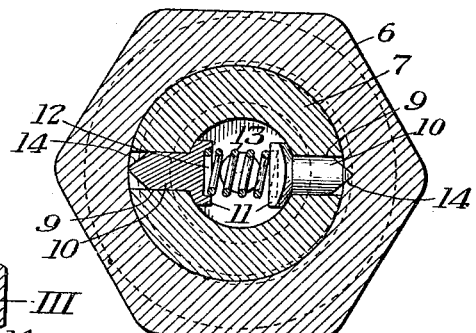
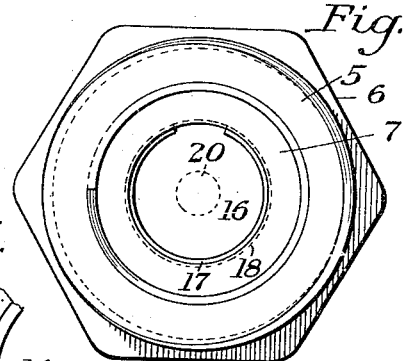
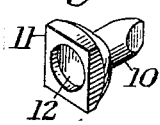
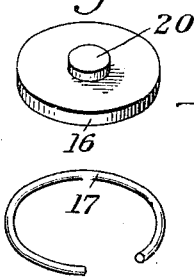
INVENTOR
Frederick K. Landgraf
By Byrnes, Stebbins & Parmelee
His Attys Patented Feb. 23, 1926.

1,574,583

UNITED STATES PATENT OFFICE.

FREDERICK K. LANDGRAF, OF CRAFTON, PENNSYLVANIA, ASSIGNOR TO FLANNERY BOLT COMPANY, OF PITTSBURGH, PENNSYLVANIA, A CORPORATION OF PENNSYLVANIA.

FORCE-FEED LUBRICATOR.

Application filed January 31, 1924. Serial No. 689,678.

*To all whom it may concern:*

Be it known that I, FREDERICK K. LANDGRAF, a citizen of the United States, residing at Crafton, in the county of Allegheny and State of Pennsylvania, have invented a new and useful Improvement in Force-Feed Lubricators, of which the following is a full, clear, and exact description.

The present invention relates broadly to force-feed lubricators, and more particularly to lubricators of this character having a screw plug for expressing the lubricant.

It is customary to employ lubricators of this type for supplying lubricant to the bearings of connecting rods of steam locomotives. Lubricators so employed are subjected to constant jar or vibration tending to cause the plugs to gradually unscrew and finally shake out of their holders and drop by the wayside. When the large number of such lubricators employed on locomotives of steam railways is considered, it will be appreciated that a considerable loss is entailed by reason of this loosening and dropping out of the plugs of the lubricators. Moreover, this constant tendency of the plugs to unscrew from their holders causes the lubricators to function inefficiently.

By the present invention I overcome this difficulty by the provision of a simple form of friction locking means for preventing unintentional rotation of the plugs of lubricators of the above type.

A preferred embodiment of the invention is illustrated in the accompanying drawings, in which—

Figure 1 is a view of a portion of a connecting rod having associated therewith a force-feed lubricator embodying my invention;

Figure 2 is a vertical sectional view of the lubricator;

Figure 3 is a section on the line III—III of Figure 2;

Figure 4 is a bottom plan view of the lubricator; and

Figures 5, 6, 7 and 8 are detail views.

Figure 1 illustrates the customary manner of associating a force-feed lubricator with the connecting rod 2 of a locomotive. The connecting rod is provided with a lubricant holding well 3 adapted to supply lubricant to the crank pin bearing through a small opening 4. The lubricator may comprise a holder 5 in the form of a nut threaded on its exterior as well as on its interior, whereby it is adapted to be tapped into the connecting rod. The nut may also be welded in position to provide additional security against it loosening and dropping out of its seat. This nut is preferably formed with a faceted head 6 to facilitate turning the same by means of a wrench.

Fitting the nut 5 is a screw-threaded hollow plug 7 having a faceted head 8 for co-operation with a wrench. Near the lower end of the plug the bore thereof is intersected by two diametrically opposite openings 9 extending through the wall of the plug. Working in these openings is a pair of plungers 10, the outer ends of which are double beveled and the inner ends of which have integral flat sided heads 11. The head of each plunger has a recess 12 formed therein to receive the end of a coil spring 13 which is interposed between the plungers and constantly tends to move them outwardly. The threads on the interior of the nut 5 are interrupted by two diametrically opposite vertical V-shaped grooves 14 in which the beveled ends of the plungers are adapted to seat. One of these grooves is shown more clearly in Figure 5.

At the lower end of the plug, the bore thereof is slightly enlarged, thereby providing a shoulder 15 which forms a seat for a closure disk 16. The disk is removably held in place on its seat by means of a retaining spring 17 positioned in a groove 18 in the wall of said enlarged portion of the bore of the plug. The disk 16 cooperates with a flat side of each head 11 to prevent the plungers from rotating and to thereby maintain the outer edges thereof parallel to the grooves 14. A lug 20 projects from the upper side of the disk between the heads of the plungers and serves to limit inward movement thereof, in order to prevent injury to the spring, due to too great a compression thereof.

It will be apparent that when the beveled ends of the spring-pressed plungers are in engagement with the grooves 14, unintentional rotation of the plug, due to jar or vibration, will be prevented. However, the plug may be readily rotated in either direction by means of a wrench, the beveled ends of the plungers cooperating with the walls of the grooves 14 to force the plungers inwardly. In the illustrative embodiment of the invention, I have shown only one pair of diametrically opposite grooves 14 for cooperation with the plungers so that, with such a construction, the plug will be frictionally locked against rotation at the end of each half revolution thereof. However, it will be obvious that additional pairs of diametrically opposite grooves may be provided if desired, in order to enable the plug to be frictionally locked at the end of a partial rotation thereof less than 180 degrees. The removable disk 16 closing the lower end of the bore in the plug permits easy access to the interior of the plug for assembling, disassembling or replacing the parts of the friction lock. If desired, a quantity of lubricant may be introduced into the interior of the plug to lubricate the parts of the friction lock.

While I have shown and described a preferred embodiment of my invention, it will be understood that changes may be made in the details of construction without departing from the spirit of the invention or scope of the appended claims. Furthermore, while my invention is particularly useful in connection with a force-feed lubricator, its utility is not limited in this respect, as it may be useful as a friction lock for the relatively movable parts of devices other than force-feed lubricators.

I claim:

1. A force-feed lubricator, comprising a holder having a screw-threaded bore, a screw-threaded plug mounted in said holder and formed with an interior recess intersected by two diametrically opposite openings in the wall of said plug, and friction means for preventing unintentional rotation of said plug, comprising a pair of plungers working in said openings, and a spring interposed between the inner ends of said plungers and tending to force them outwardly, said plungers having their outer ends shaped for cooperation with diametrically opposite grooves formed in the inner wall of said holder and extending parallel to the axis thereof, substantially as described.

2. A force-feed lubricator, comprising a holder having a screw-threaded bore, a screw-threaded plug mounted in said holder and formed with an interior recess opening at the lower end of said plug and intersected by two diametrically opposite openings in the wall of said plug, a pair of plungers working in said openings and each having a flat sided head at its inner end, a spring interposed between the heads of said plungers and tending to force them outwardly, and a removable closure for the recess in said plug cooperating with a flat side of the head of each of said plungers for preventing rotation of said plungers, the outer ends of said plungers being double beveled and adapted to engage in diametrically opposite V-shaped grooves formed in the inner wall of said holder and extending parallel to the axis thereof, substantially as described.

3. A force-feed lubricator, comprising a holder having a screw-threaded bore, a screw-threaded plug mounted in said holder and formed with an interior recess opening at the lower end of said plug and intersected by two diametrically opposite openings in the wall of said plug, a pair of plungers working in said openings and each formed with a flat sided head at its inner end, a spring interposed between the heads of said plungers and tending to force them outwardly, and a closure for the recess in said plug cooperating with a flat side of the head of each of said plungers for preventing rotation thereof and having a lug projecting between the heads of the plungers for limiting inward movement thereof, the outer ends of said plungers being double beveled for cooperation with V-shaped grooves formed in the inner surface of said holder and extending parallel to the axis thereof, substantially as described.

4. The combination with a pair of interfitting relatively rotatable members, the inner of which is provided with an interior recess, of friction means for preventing unintentional relative rotation of said members, comprising a pair of plungers working in diametrically opposite openings in the wall of said inner member which intersect the recess therein, and a spring located in said recess and interposed between the inner ends of said plungers and tending to force them outwardly, the outer of said members having grooves in the inner surface thereof for cooperation with the outer ends of said plungers, which are shaped for cooperation with said grooves, said grooves extending substantially parallel to the axis of rotation of said members, substantially as described.

5. A force-feed lubricator, comprising interfitting relatively rotatable screw-threaded members, the inner of which is provided with an interior recess intersected by two diametrically opposite openings in the wall of said member, and friction means for preventing unintentional relative rotation of said members comprising a pair of plungers working in said openings, and a spring interposed between the inner ends of said plungers and tending to force them outwardly, said plungers having their outer ends shaped for cooperation with grooves formed in the inner wall of the outer member and interrupting and extending at an angle to the threads thereof, substantially as described.

In testimony whereof I have hereunto set my hand.

FREDERICK K. LANDGRAF.